United States Patent
Yeh et al.

(10) Patent No.: US 7,809,164 B2
(45) Date of Patent: Oct. 5, 2010

(54) METHODS AND SYSTEMS FOR IDENTIFYING EVENTS FOR A VEHICLE

(75) Inventors: Chia-Hung Yeh, Tai-Nan (TW); Hsuan-Huei Shih, Taipei (TW)

(73) Assignee: MAVs Lab. Inc., Taipei (TW)

( * ) Notice: Subject to any disclaimer, the term of this patent is extended or adjusted under 35 U.S.C. 154(b) by 939 days.

(21) Appl. No.: 11/621,577

(22) Filed: Jan. 10, 2007

(65) Prior Publication Data

US 2008/0166050 A1    Jul. 10, 2008

(51) Int. Cl.
*G06K 9/00* (2006.01)

(52) U.S. Cl. .................................. 382/104; 340/436

(58) Field of Classification Search ................ 382/103, 382/104; 340/933, 937, 435, 436; 348/113
See application file for complete search history.

(56) References Cited

U.S. PATENT DOCUMENTS

| | | | | |
|---|---|---|---|---|
| 5,777,690 A | * | 7/1998 | Takeda et al. | 348/699 |
| 5,969,755 A | * | 10/1999 | Courtney | 348/143 |
| 7,130,448 B2 | * | 10/2006 | Nagaoka et al. | 382/104 |
| 2004/0234136 A1 | * | 11/2004 | Zhu et al. | 382/224 |
| 2005/0131646 A1 | * | 6/2005 | Camus | 701/301 |
| 2005/0135658 A1 | * | 6/2005 | Yamamoto et al. | 382/104 |
| 2006/0115124 A1 | * | 6/2006 | Nobori et al. | 382/104 |

* cited by examiner

*Primary Examiner*—Jon Chang
(74) *Attorney, Agent, or Firm*—Winston Hsu; Scott Margo; Min-Lee Teng (57) ABSTRACT

A system for identifying an event for a vehicle is disclosed. The system includes: a video source; a receiving circuit, coupled to the video source, for receiving at least a target image from the video source positioned on the vehicle; and a determining circuit, coupled to the receiving circuit, for determining if the event occurs according to the target image. A related method includes: receiving at least a target image from a video source positioned on the vehicle; and determining if the event occurs according to the target image.

36 Claims, 9 Drawing Sheets

METHODS AND SYSTEMS FOR IDENTIFYING EVENTS FOR A VEHICLE

BACKGROUND OF THE INVENTION

1. Field of the Invention

The present invention relates methods for identifying events for a vehicle and systems thereof, and more specifically, relates methods for identifying events for a vehicle by analyzing an image received from a video source positioned on the vehicle and systems thereof.

2. Description of the Prior Art

Nowadays, advanced electronics, communications, and system-controlling techniques are well developed, and often applied to vehicle production or driving services for improving driving safety systems. These techniques can prevent accidents and improve traffic safety by monitoring the alertness of drivers, augmenting vision fields to prevent collision, and providing information on safety. For example, a Digital Video (DV) camera positioned on the car can be utilized for capturing a plurality of images continuously when the car is moving, and the images can be analyzed for obtaining image information to determine the situation of the car. In general, the image information is two-dimensional and each of the images has a scanline in the same position. The image information can be defined by its spatial characteristics (information from the scanlines) and its temporal characteristics (information at different timing). In addition, spatial information can be transformed to temporal information by calculating a statistical characteristic of the scanlines, i.e. the scanlines can be utilized to gather spatial information to get temporal information.

An advanced and integrated intellectual communication environment will provide people with good driving conditions and traffic services, which will certainly make it safer to drive. How to detect vehicle events both efficiently and accurately dominates the overall performance of the auxiliary system.

SUMMARY OF THE INVENTION

It is therefore one of the objectives of the claimed invention to provide a method for identifying an event for a vehicle. According to an embodiment of the present invention, the method comprises: receiving at least a target image from a video source positioned on the vehicle; and determining if the event occurs according to the target image.

It is another objective of the claimed invention to provide a system for identifying an event for a vehicle. According to an embodiment of the present invention, the system comprises: a video source; a receiving circuit, coupled to the video source, for receiving at least a target image from the video source positioned on the vehicle; and a determining circuit, coupled to the receiving circuit, for determining if the event occurs according to the target image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
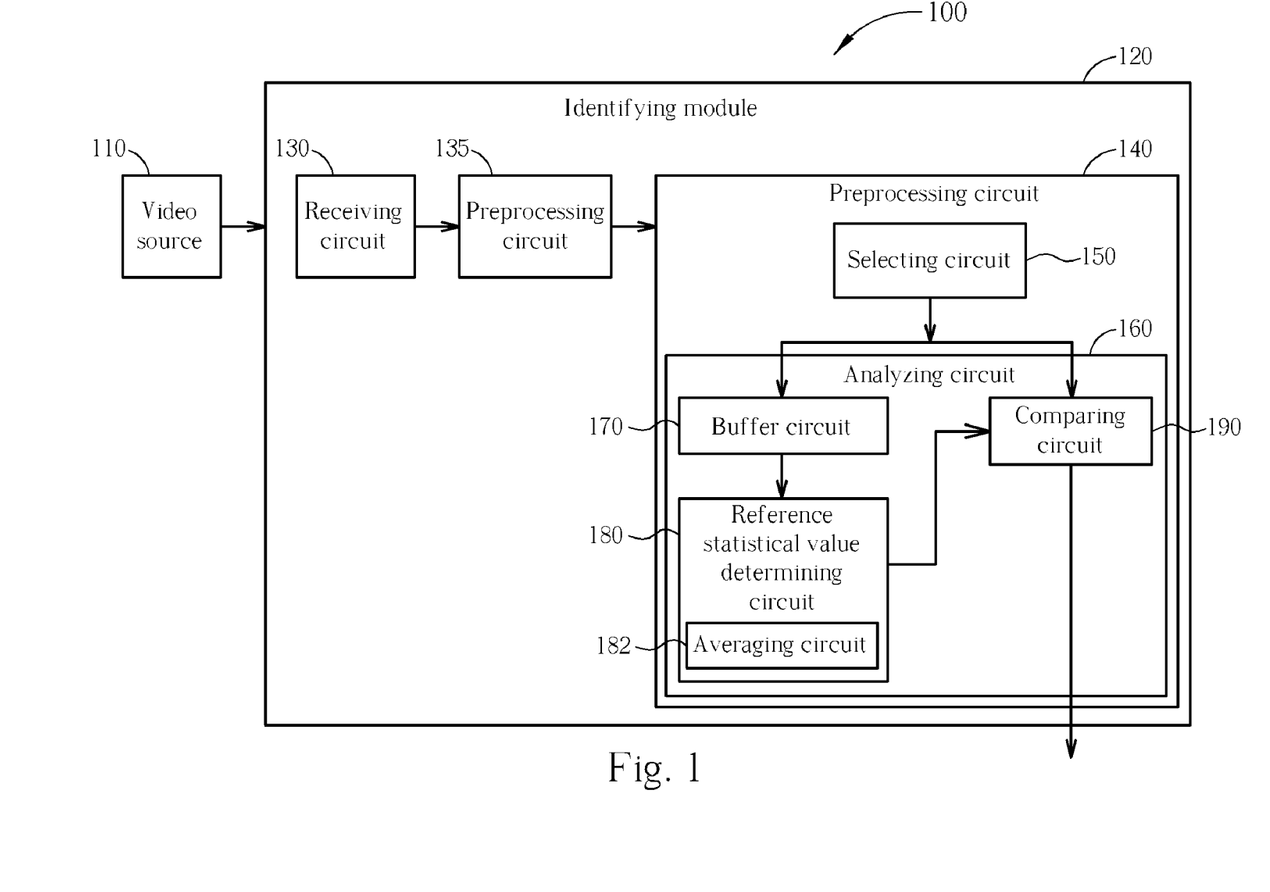
FIG. 1 is a block diagram of a first embodiment of a vehicle event detection system according to the present invention.

Please refer to FIG. 1. FIG. 1 is a block diagram of a first embodiment of a vehicle event detection system 100 capable of identifying events for a vehicle (e.g. warning distance events) according to the present invention. In this embodiment, the term "vehicle" can be representative of any transport appliance, such as a car moving on a road. The vehicle event detection system 100 comprises a video source 110 and an identifying module 120. In this embodiment the video source 110 is implemented using a Digital Video (DV) camera positioned on the car for capturing a plurality of images continuously when the car is moving. However, this is not meant to be a limitation of the present invention.

The identifying module 120 utilizes at least a target image received from the video source 110 to identify the event for the vehicle. The identifying module 120 comprises a receiving circuit 130, a preprocessing circuit 135, and a determining circuit 140. The receiving circuit 130 is coupled to the video source 110 for receiving at least a target image from the video source 110 positioned on the vehicle. The preprocessing circuit 135 is coupled to the receiving circuit 130 for preprocessing the incoming images before the following image processing is activated. The determining circuit 140 is coupled to the preprocessing circuit 135 for determining if the event occurs according to the incoming target image. As shown in FIG. 1, the determining circuit 140 comprises a selecting circuit 150 and an analyzing circuit 160. The selecting circuit 150 is for selecting at least a predetermined image region from the target image. The analyzing circuit 160 is coupled to the selecting circuit 150 for analyzing the predetermined image region identified by the selecting circuit 150 to determine if the warning distance event occurs.

In this embodiment, the analyzing circuit 160 comprises a buffer circuit 170, a reference statistical value determining circuit 180, and a comparing circuit 190. The buffer circuit 170 is coupled to the selecting circuit 150 for receiving a plurality of images prior to receiving the target image. Please note that the selection of the images prior to the target image is updated each time the target image is changed. The reference statistical value determining circuit 180 is coupled to the buffer circuit 170 for determining a reference statistical value (e.g. a variance, a mean, or a moment) of the predetermined image region according to image information of the predetermined image region in each of the images. In addition, the reference statistical value determining circuit 180 comprises an averaging circuit 182 for averaging a plurality of statistical values corresponding to the predetermined image region in the images to generate the reference statistical value. As shown in FIG. 1, the comparing circuit 190 is coupled to the selecting circuit 150 and the reference statistical value determining circuit 180 for comparing a statistical value of the predetermined image in the target image with the aforementioned reference statistical value to determine if the warning distance event occurs. Therefore, if a difference between the reference statistical value and the statistical value is greater than a threshold value, the comparing circuit 190 determines that the warning distance event occurs.

Figure 2:
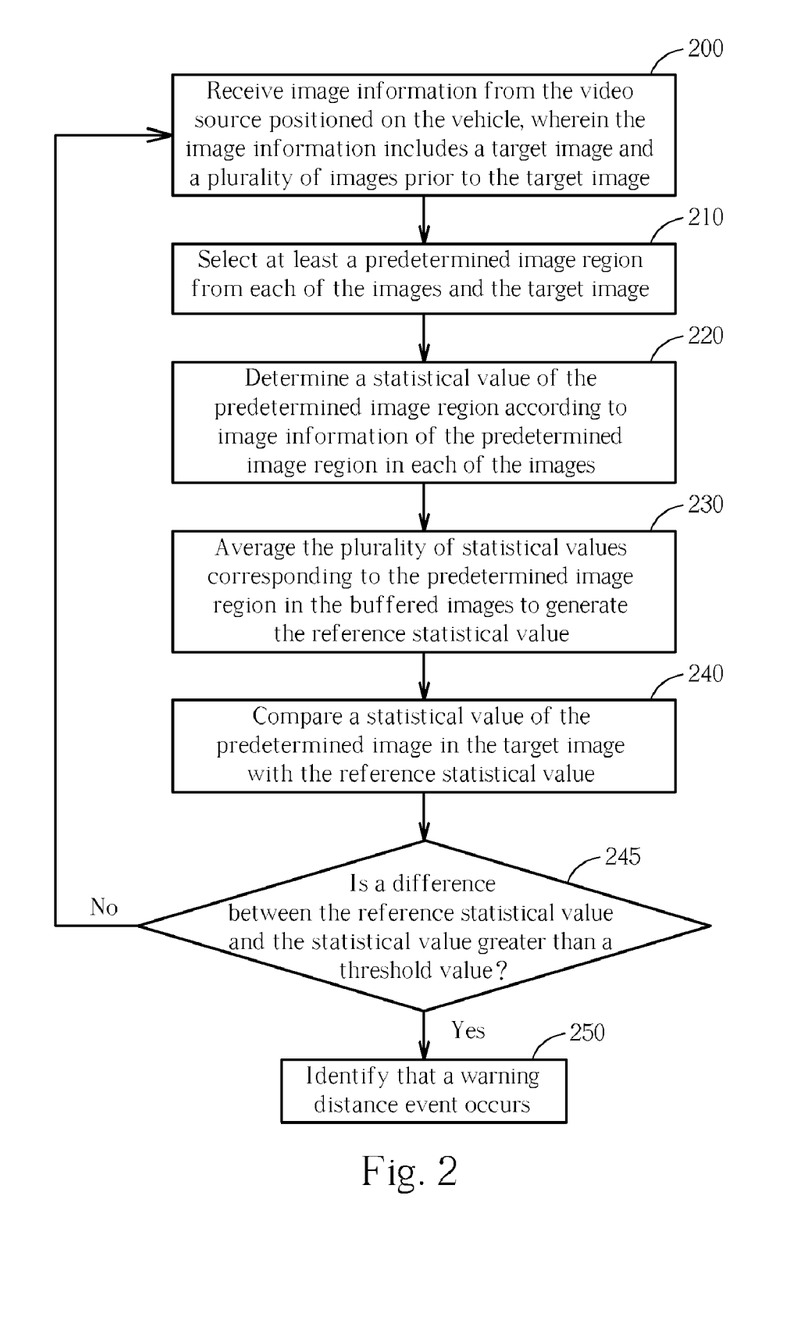
FIG. 2 is a flowchart of a first method employed by the vehicle event detection system shown in FIG. 1.

Please refer to FIG. 2 in conjunction with FIG. 1. FIG. 2 is a flowchart of a first method employed by the vehicle event detection system 100 for identifying an event (e.g. the warning distance event) for a vehicle. Suppose that the result is substantially the same. The execution of steps in the flow is not limited to the exact order shown in FIG. 2. Identifying the warning distance event for a vehicle is summarized as below:

Step 200: Receive image information from the video source positioned on the vehicle, wherein the image information includes a target image and a plurality of images prior to the target image.

Step 210: Select at least a predetermined image region from each of the images and the target image.

Step 220: Determine a statistical value of the predetermined image region according to image information of the predetermined image region in each of the images.

Step 230: Average the plurality of statistical values corresponding to the predetermined image region in the buffered images to generate the reference statistical value.

Step 240: Compare a statistical value of the predetermined image in the target image with the reference statistical value.

Step 245: Is a difference between the reference statistical value and the statistical value greater than a threshold value? If yes, go to step 250; otherwise, go back to step 200 to proceed to processing the next target image and updated previous images thereof.

Step 250: Identify that a warning distance event occurs.

Figure 3:
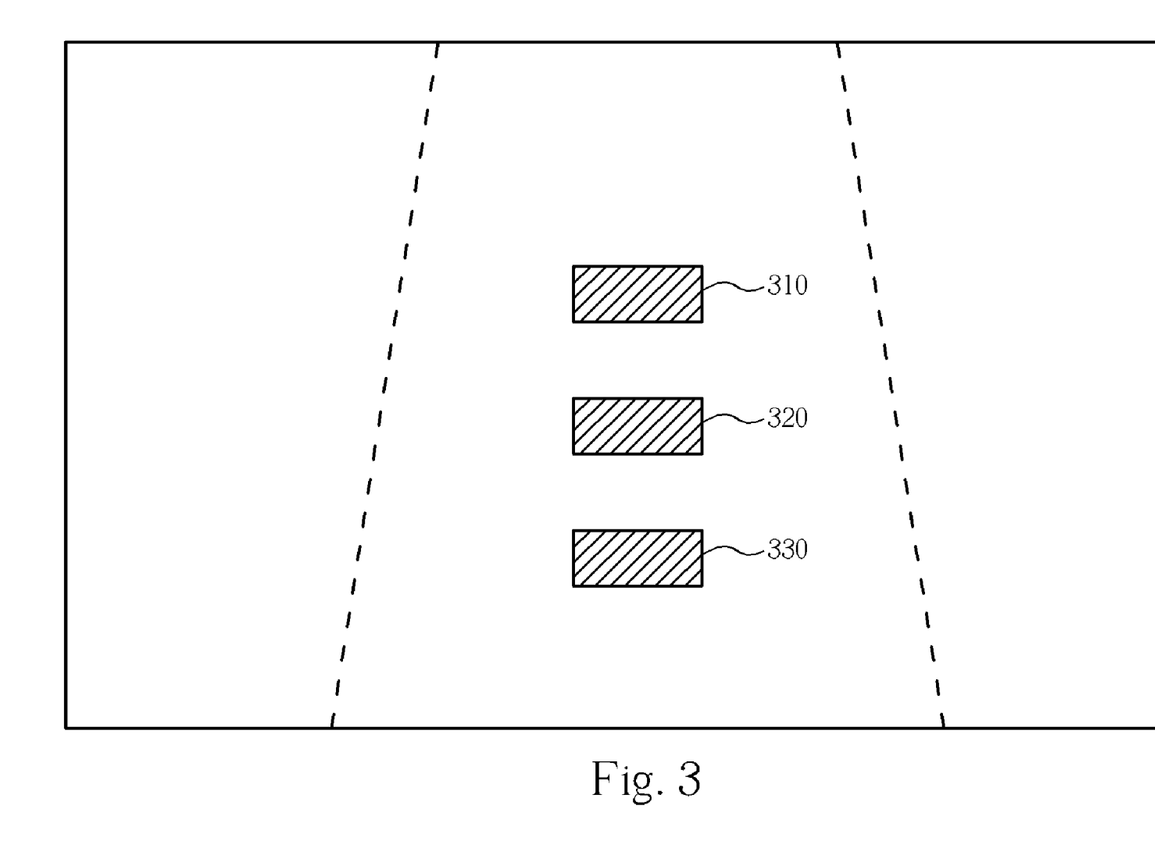
FIG. 3 is a diagram illustrating selected predetermined image region(s) to be monitored for identifying a warning distance event for a vehicle.

Please refer to FIG. 3. FIG. 3 is a diagram illustrating the selected predetermined image region(s) to be monitored for identifying a warning distance event for a vehicle according to an embodiment of the present invention. According to this embodiment, the receiving circuit 130 receives image information from the video source 110 positioned on the vehicle (step 200), and the selecting circuit 150 selects at least a predetermined image region, such as a region 310, a region 320 and a region 330, from each of the plurality of images (step 210). For clarity, only the region 310 is selected as an example to illustrate the operation of identifying the warning distance for a vehicle. The buffer circuit 170 receives a plurality of images, for example, including a target image and five images (this is not meant to be a limitation of the present invention) prior to the target image, and the reference statistical value determining circuit 180 then determines a statistical value of the region 310 according to image information of the region 310 in each of the images received prior to the target image (step 220). The averaging circuit 182 averages the plurality of statistical values corresponding to the region 310 in the images to generate the reference statistical value (step 230). Next, the comparing circuit 190 compares a statistical value of the region 310 in the target image with the reference statistical value (step 240). If a difference between the reference statistical value and the statistical value is greater than a threshold value, the analyzing circuit 160 identifies the warning distance event through monitoring contents in the region 310 (step 250).

Please note that the identifying method applied to the region 310 is identical to that applied to other regions 320 and 330. If the region 320 has a warning distance event and the region 310 does not have a warning distance event, it indicates that there is an obstacle between region 310 and region 320; If the region 320 has a warning distance event and the region 330 does not have a warning distance event, it indicates that there is an obstacle between region 320 and region 330; if the region 330 has a warning distance event, it indicates that there is an obstacle between region 330 and the vehicle (e.g. a car). It should be noted that the number of regions to be monitored and the locations of the monitored regions are not limited to the example shown in FIG. 3. Other configurations are possible according to design requirements.

In the above example, the vehicle event detection system 100 is for detecting the warning distance event. The vehicle event detection system 100 is capable of detecting other vehicle events, however, such as passing events. In a case of detecting passing events, the determining circuit 140 is operative to determine if the passing event occurs according to the target image, where the selecting circuit 150 is operative to select a scanline from each of the target images, and the analyzing circuit 160 is operative to analyze the scanline of each of the target images to determine if the passing event occurs. In this case, the buffer circuit 170 is operative to receive a plurality of images prior to the target image. Similarly, the selection of the images prior to the target image is updated each time the target image is changed. The reference pixel value determining circuit 180 is operative to determine reference pixel values of pixels at the scanline according to image information of the scanline in each of the images received prior to the target image. The averaging circuit 182 is operative to average a plurality of pixel values corresponding to the pixels at the scanline in the images received prior to the target image to generate the reference pixel values of the selected scanline. Next, the comparing circuit 190 is operative to compare pixel values of the pixels at the scanline in the target image with the reference pixel values to determine if the passing event occurs. If a ratio of a sum of pixel differences between the reference pixel values of the scanline and the pixel values at the same scanline in the target image to a sum of the reference pixel values is greater than a threshold value, the comparing circuit 190 determines that the passing event occurs.

Figure 4:
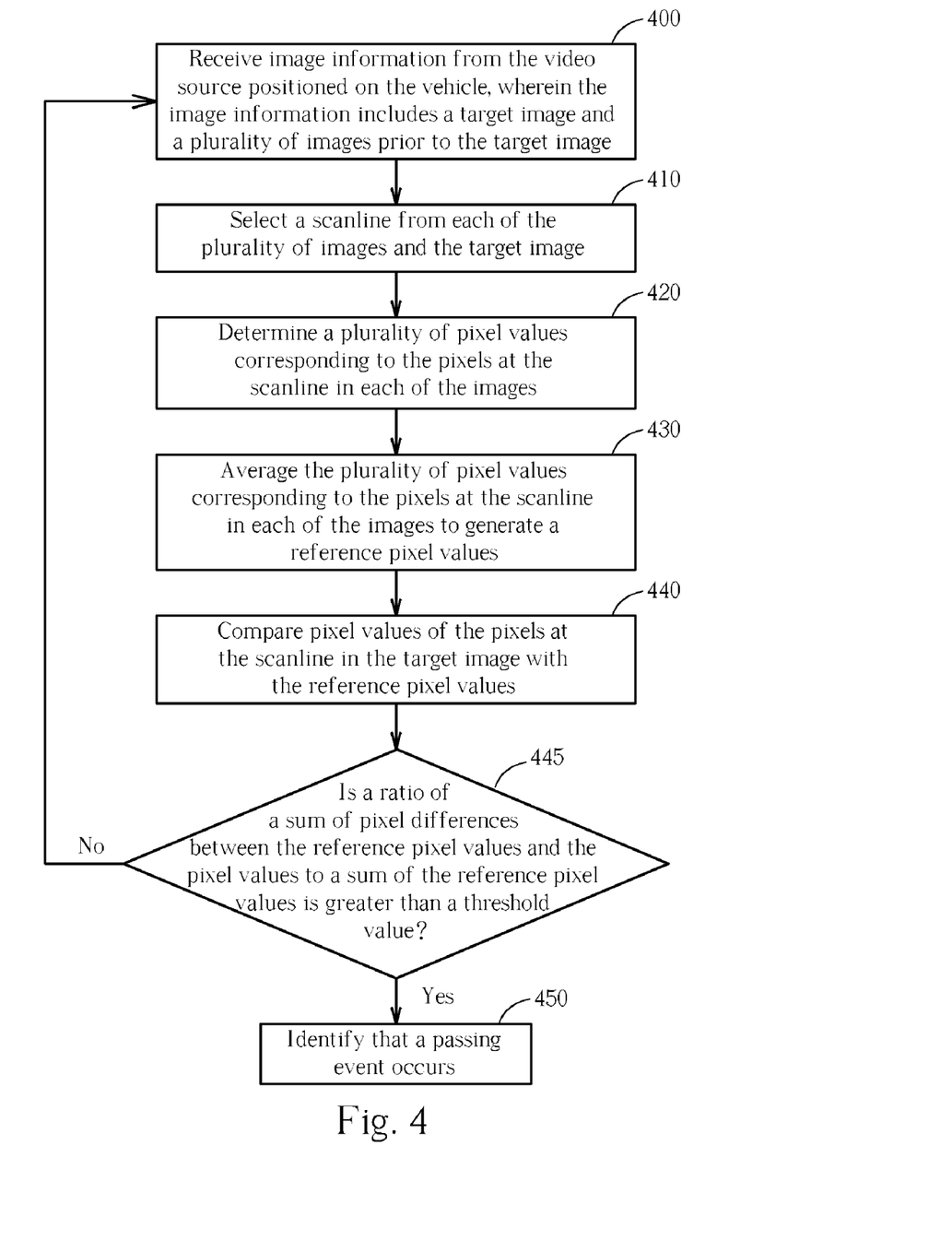
FIG. 4 is a flowchart of a second method employed by the vehicle event detection system shown in FIG. 1.

Please refer to FIG. 4 in conjunction with FIG. 1. FIG. 4 is a flowchart of a second method employed by the vehicle event detection system 100 for identifying an event (e.g. the passing event) for a vehicle. Suppose that the result is substantially the same. The execution of steps in the flow is not limited to the exact order shown in FIG. 4. Identifying the passing event for a vehicle is summarized as below:

Step 400: Receive image information from the video source positioned on the vehicle, wherein the image information includes a target image and a plurality of images prior to the target image.

Step 410: Select a scanline from each of the plurality of images and the target image.

Step 420: Determine a plurality of pixel values corresponding to the pixels at the scanline in each of the images.

Step 430: Average the plurality of pixel values corresponding to the pixels at the scanline in each of the images (e.g. one hundred images prior to the target image) to generate reference pixel values.

Step 440: Compare pixel values of the pixels at the scanline in the target image with the reference pixel values.

Step 445: Is a ratio of a sum of pixel differences between the reference pixel values and the pixel values to a sum of the reference pixel values greater than a threshold value? If yes, go to step 450; otherwise, go back to step 400 to proceed processing the next target image and updated previous images thereof.

Step 450: Identify that a passing event occurs.

Figure 5:
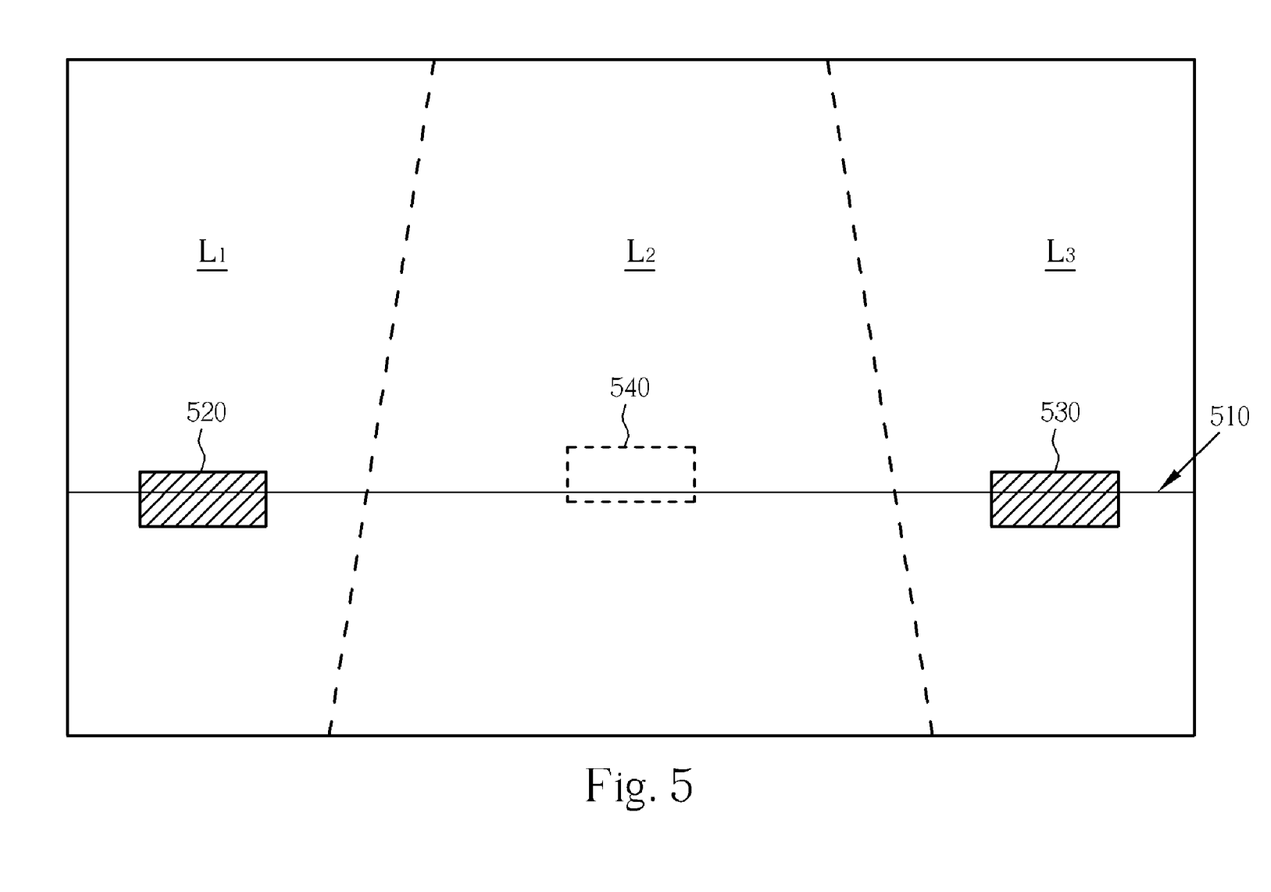
FIG. 5 is a diagram illustrating a selected scanline to be monitored for identifying a passing event for a vehicle.

Please refer to FIG. 5. FIG. 5 is a diagram illustrating the selected scanline to be monitored for identifying a passing event for a vehicle according to an embodiment of the present invention. According to this embodiment, the receiving circuit 130 receives image information from the video source 110 positioned on the vehicle (step 400), and the selecting circuit 150 selects a scanline 510, consisting of a plurality of pixels, from each of the plurality of images (step 410). The buffer circuit 170 receives a plurality of images, for example, including a target image and one hundred images (this is not meant to be a limitation of the present invention) received prior to the target image, and the reference pixel value determining circuit 180 then determines a plurality of pixel values corresponding to the pixels at the scanline 510 in each of the images (step 420). Next, the averaging circuit 182 averages the plurality of pixel values corresponding to the pixels at the scanline 510 in each of the images to generate reference pixel values $P_d$ (step 430). Finally, the comparing circuit 190 compares pixel value $P_t$ of the pixels at the scanline 510 in the target image with the computed reference pixel values $P_d$ (step 440). If a ratio of a sum of pixel differences between the reference pixel values and the pixel values to a sum of the reference pixel values, ($abs(P_d-P_t)/P_d$), is greater than a threshold value, the analyzing circuit 160 identifies a passing event through monitoring pixel value variation of the pixels at the selected scanline (step 450). For example, referring to FIG. 5, there are three lanes $L_1$, $L_2$, $L_3$ on a freeway, where a car equipped with the vehicle event detection system 100 is currently moving on the middle lane $L_2$, one neighboring car is currently moving on the left lane $L_1$, and another neighboring car is currently moving on the right lane $L_3$. If the car 520 passes the car equipped with the vehicle event detection system 100 and moves from the left lane $L_1$ to the middle lane $L_2$, the new position of the car 520 will be marked by a block 640 as shown in FIG. 5. It is clear that a pixel difference is induced at the scanline 510 due to the car 520 leaving the left lane $L_1$, and another pixel difference is induced at the scanline 510 due to the car 520 appearing on the middle lane $L_2$. Therefore, the vehicle event detection system 100 will quickly acknowledge the great pixel value variation and identify that a passing event occurs. Similarly, as the car 530 on the right lane $L_3$ passes the car equipped with vehicle event detection system 100 and moves from the right lane $L_3$ to the middle lane $L_2$, the vehicle event detection system 100 will easily detect the passing event using the aforementioned detection mechanism.

Figure 6:
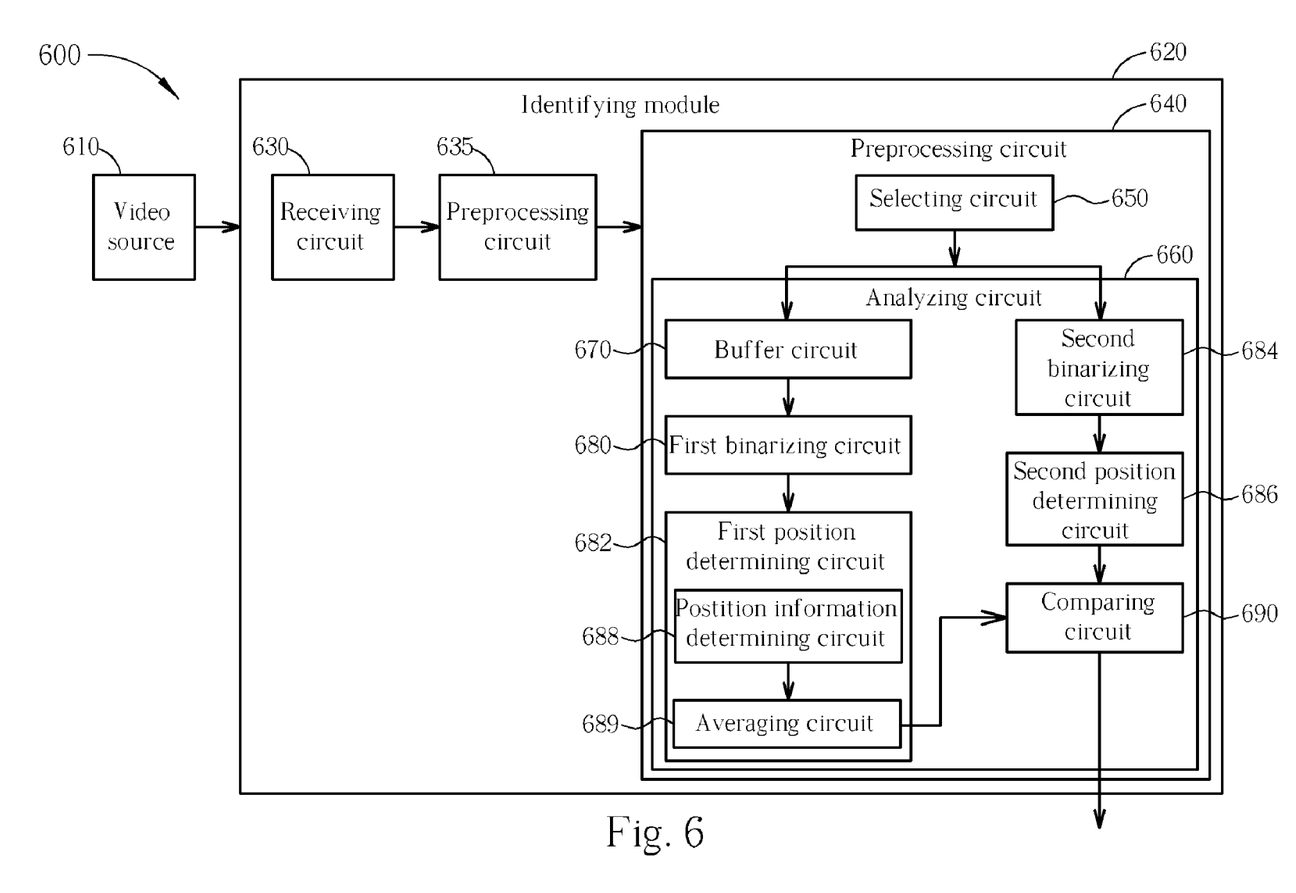
FIG. 6 is a block diagram of a second embodiment of a vehicle event detection system according to the present invention.

Please refer to FIG. 6. FIG. 6 is a block diagram of a second embodiment of a vehicle event detection system 600 capable of identifying events (e.g. line change event) for a vehicle according to the present invention. In this embodiment, this term "vehicle" can be representative of any transport appliance, such as a car moving on a road. The vehicle event detection system 600 comprises a video source 610 and an identifying module 620. In this embodiment, the video source 610 is a digital video (DV) camera positioned on the car for capturing a plurality of images continuously when the car is moving. However, this is not meant to be a limitation of the present invention.

The identifying module 620 utilizes at least a target image received from the video source 610 to identify the event for the vehicle. The identifying module 620 comprises a receiving circuit 630, a preprocessing circuit 635 and a determining circuit 640. The receiving circuit 630 is coupled to the video source 610 for receiving at least a target image from the video source positioned on the vehicle. The preprocessing circuit 635 is coupled to the receiving circuit 630 for preprocessing incoming images before the following image processing is activated. The determining circuit 640 is coupled to the receiving circuit 630 for determining if the event occurs according to the target image. In this embodiment, the determining circuit 640 comprises a selecting circuit 650 and an analyzing circuit 660, where the selecting circuit 650 is for selecting a scanline from each of the images, and the analyzing circuit 660 is coupled to the selecting circuit 650 for analyzing the scanline of each of the images to determine if the line change event occurs.

The analyzing circuit 660 comprises a buffer circuit 670, a first binarizing circuit 680, a first position determining circuit 682, a second binarizing circuit 684, a second position determining circuit 686, and a comparing circuit 690. The buffer circuit 670 is coupled to the selecting circuit 650 for receiving a plurality of images prior to the target image. Please note that the selection of the images prior to the target image is updated each time the target image is changed. The first binarizing circuit 680 is coupled to the buffer circuit 670 for utilizing a reference value to binarize pixel values of all pixels at the scanline in each of the images to identify specific pixels in each of the images that have pixel values greater than the reference value. The first position determining circuit 682 is coupled to the first binarizing circuit 680 for utilizing the found specific pixels in each of the images to determine a reference position. The second binarizing circuit 684 is coupled to the selecting circuit 650 for utilizing the reference value to binarize pixel values of all pixels at the scanline in the target image to identify specific target pixels having pixel values greater than the reference value. The second position determining circuit 686 is coupled to the second binarizing circuit 684 for utilizing the found specific target pixels in the target image to determine a position.

As shown in FIG. 6, the first position determining circuit 682 comprises a position information determining circuit 688 and an averaging circuit 689. The position information determining circuit 688 is for determining a specific position corresponding to each of the images according to the specific pixels in each of the images. The averaging circuit 689 is coupled to the position information determining circuit 688 for averaging a plurality of specific positions corresponding to the respective images to generate the reference position. The comparing circuit 690 is coupled to the first position determining circuit 682 and the second position determining circuit 686 for comparing the computed reference position with the position associated with the target image to determine if the line change event occurs.

Figure 7:
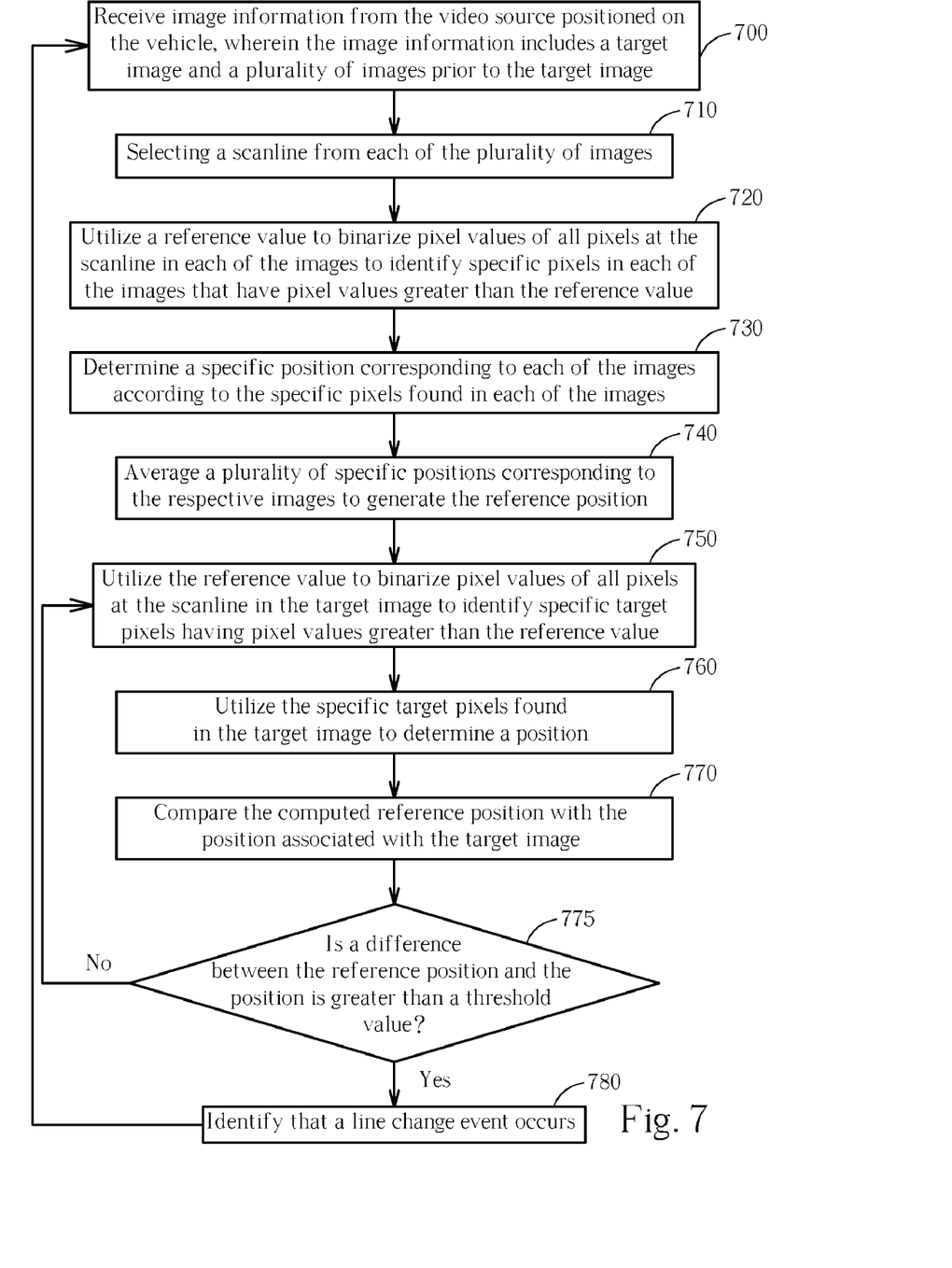
FIG. 7 is a flowchart of a method employed by the vehicle event detection system shown in FIG. 6.

Please refer to FIG. 7 in conjunction with FIG. 6. FIG. 7 is a flowchart of a method employed by the vehicle event detection system 600 for identifying a line change event for a vehicle. Suppose that the result is substantially the same. The execution of steps in the flow is not limited to the exact order shown in FIG. 7. Identifying the line change event for a vehicle is summarized as below:

Step 700: Receive image information from the video source positioned on the vehicle, wherein the image information includes a target image and a plurality of images prior to the target image.

Step 710: Select a scanline from each of the plurality of images.

Step 720: Utilize a reference value to binarize pixel values of all pixels at the scanline in each of the images to identify specific pixels that have pixel values greater than the reference value.

Step 730: Determine a specific position corresponding to each of the images according to the specific pixels found in each of the images (e.g. thirty images).

Step 740: Average a plurality of specific positions corresponding to the respective images to generate the reference position.

Step 750: Utilize the reference value to binarize pixel values of all pixels at the scanline in the target image to identify specific target pixels having pixel values greater than the reference value.

Step 760: Utilize the specific target pixels found in the target image to determine a position.

Step 770: Compare the computed reference position with the position associated with the target image.

Step 775: Is a difference between the reference position and the position greater than a threshold value? If yes, go to step 780; otherwise, go to step 750 to proceed to processing the next target image.

Step 780: Identify that a line change event occurs, and go to step 700 to update the previous reference position and to proceed processing the next target image.

Please note that the separation line between two adjacent lanes is commonly white, and the gray level of a white pixel is 255 and the gray level of a black pixel is 0. According to this embodiment, when the car is moving on the road, the receiving circuit 630 receives image information from the video source 610 (step 700). The selecting circuit 650 then selects a scanline from each of the plurality of images (step 710). The buffer circuit 670 receives a plurality of images, for example, a target image and thirty images (this is not meant to be a limitation of the present invention) prior to the target image. Next, the first binarizing circuit 680 utilizes a reference value (for example, the reference value is a gray level equal to 250) to binarize pixel values of all pixels at the selected scanline in each of the images to identify specific pixels in each of the images that have pixel values greater than the reference value (i.e. 250) (step 720). When the pixel value of a specific pixel is greater than the reference value, (i.e. 250), the specific pixel is marked by a '1'. The position information determining circuit 688 determines a specific position corresponding to each of the images according to the specific pixels found in each of the images (step 730), and then the averaging circuit 689 averages a plurality of specific positions corresponding to the images received prior to the target image to generate the reference position (step 740). Similarly, the second binarizing circuit 684 utilizes the reference value (i.e. 250) to binarize pixel values of all pixels at the scanline in the target image to identify specific target pixels having pixel values greater than the reference value (step 750), and then the second position determining circuit 686 utilizes the specific target pixels in each of the images to determine a position (step 760). Next, the comparing circuit 690 compares the computed reference position with the position to determine if the line change event occurs (step 770).

Figure 8:
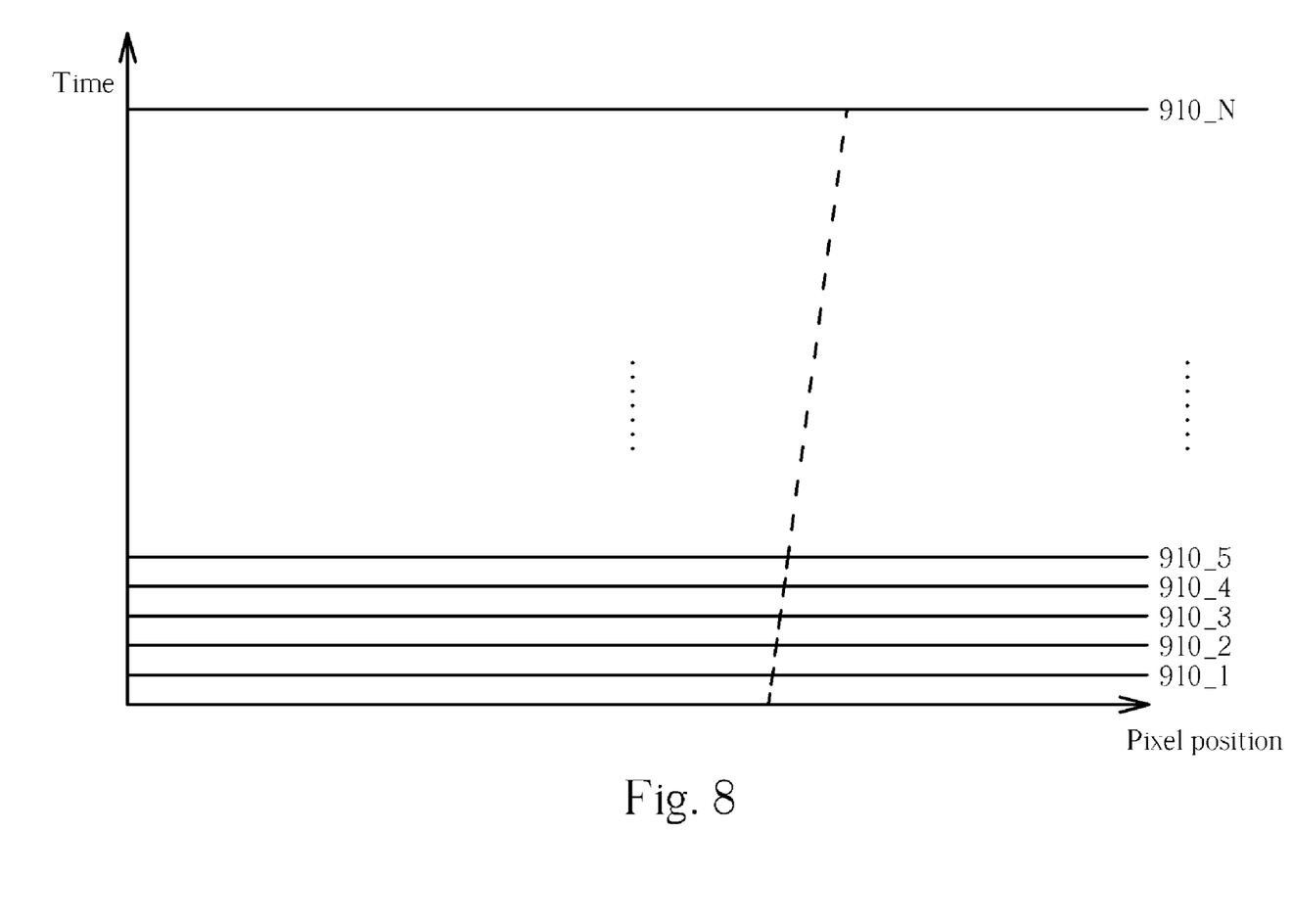
FIG. 8 is a diagram illustrating detection results of the vehicle event detection system shown in FIG. 6 when a vehicle equipped with the vehicle event detection system is moving on the same lane.
Figure 9:
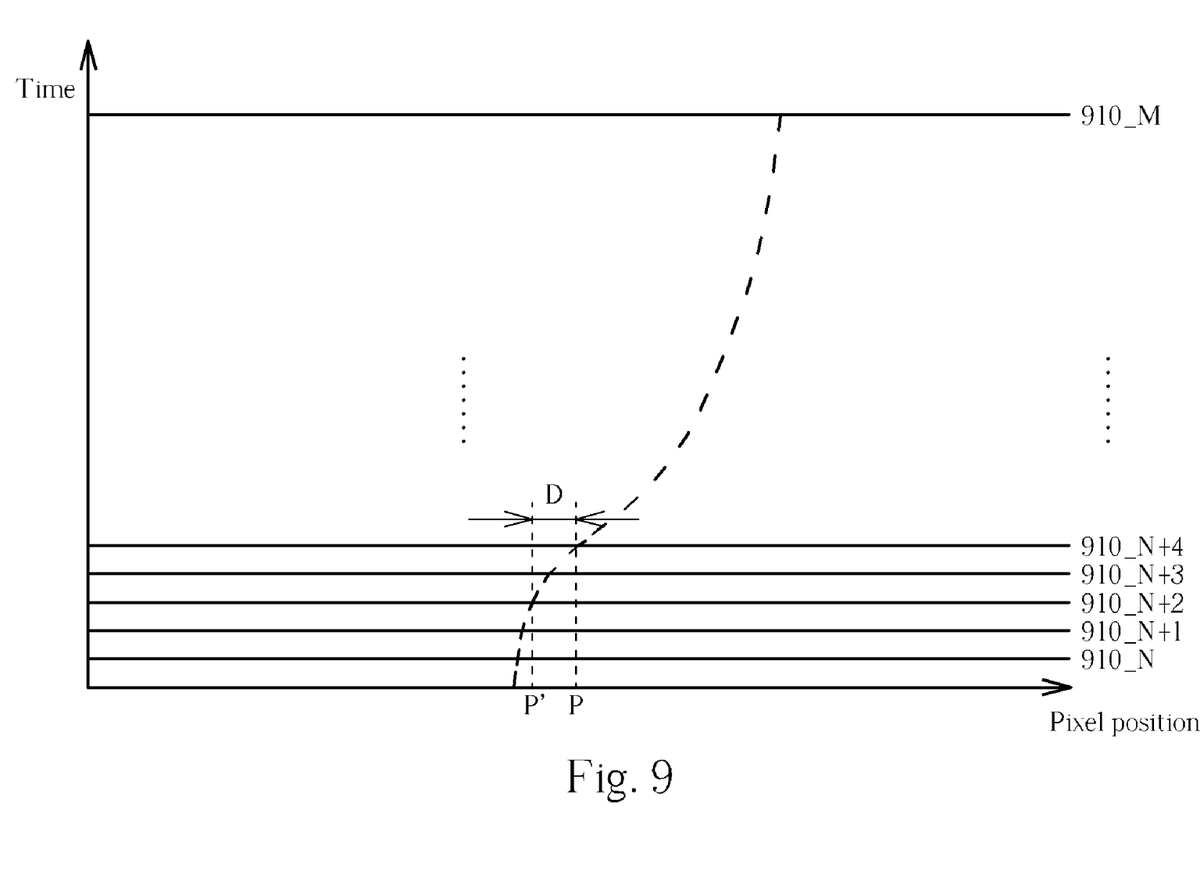
FIG. 9 is a diagram illustrating detection results of the vehicle event detection system shown in FIG. 6 when a vehicle equipped with the vehicle event detection system moves to a new lane.

The determination of the line change event is based upon the difference between the reference position computed in reference to positions found in previous images and the position found using the target image. Please refer to FIG. 8 in conjunction with FIG. 9. FIG. 8 is a diagram illustrating detection results of vehicle event detection system 600 when a vehicle equipped with the vehicle event detection system 600 is moving on the same lane. FIG. 9 is a diagram illustrating detection results of vehicle event detection system 600 when a vehicle equipped with the vehicle event detection system 600 moves to a new lane. Please note that the horizontal lines labeled 910_1, 910_2, . . . , 910_N, 910_N+1, . . . , 910_M corresponding to the same scanline in different images each serve as the target image at different timings. Additionally, the circles represent the positions found at the same scanline in the images. As mentioned above, the first position determining circuit 682 is for providing a reference position by tracking movement of the separation lines between adjacent lanes, while the second position determining circuit 686 is for providing a current position by locating current separation lines between adjacent lanes. Referring to FIG. 8, it is clear that if the car does not move from a current lane to another lane, the variation of the positions found at the same scanline in different images (i.e. the horizontal lines 910_1-910_N) is small. If the car moves from the current lane to another lane, however, the variation of the positions found at the same scanline in different images (i.e. the horizontal lines 910_N+1-910_M) is large at the time when the car is leaving the current lane. For the target image having the horizontal line 910_N+3, the difference D between the position P found in the target image and a reference position P' found using images received prior to the target image is greater than a threshold value. Therefore, the vehicle event detection system 600 will quickly identify that a line change event occurs (step 780). After line change event occurs, the vehicle event detection system 600 receives a new image information to update the previous reference position and proceed to processing the next target image.

Please note that the above embodiment directly averages positions corresponding to separation lines in each image to determine the reference position and locate the position of the target image; however, this is not a limitation of the present invention. In other embodiments, it is possible to directly utilize the positions associated with a right separation line of a single lane, a left separation line of the single lane or the center of the single lane to determine the reference position and locate the position of the target image. That is, no averaging operation is performed. These alternative designs all fall within the scope of the present invention.

Please note that when the line change event occurs, the warning distance event detection and the passing event detection are disabled. After a period of time, the warning distance event detection and the passing event detection will be reset. Furthermore, the preprocessing circuit of the present invention is implemented for noise reduction to improve the detection accuracy. The preprocessing circuit is optional, however. That is, the vehicle event detection system 100 or 600 without the preprocessing circuit still works.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for identifying an event for a vehicle, the method comprising:

receiving at least a target image from a video source positioned on the vehicle;

selecting at least a predetermined image region from the target image;

receiving a plurality of images prior to the target image;

determining a reference statistical value of the predetermined image region according to image information of the predetermined image region in each of the images; and comparing a statistical value of the predetermined image in the target image with the reference statistical value to determine if the event occurs;

wherein if a difference between the reference statistical value and the statistical value is greater than a threshold value, determining that the event occurs.

2. The method of claim 1, wherein the step of determining the reference statistical value comprises:
averaging a plurality of statistical values corresponding to the predetermined image region in the images to generate the reference statistical value.

3. The method of claim 2, wherein each statistical value is a variance, a mean, or a moment.

4. The method of claim 1, wherein a selection of the images prior to the target image is updated as the target image is changed.

5. The method of claim 1, further comprising:
preprocessing the target image before executing the step of determining if the event occurs.

6. A method for identifying an event for a vehicle, the method comprising:
receiving at least a target image from a video source positioned on the vehicle;
selecting a scanline from the target image;
receiving a plurality of images prior to the target image;
determining reference pixel values of pixels at the scanline according to image information of the scanline in each of the images; and
comparing pixel values of the pixels at the scanline in the target image with the reference pixel values to determine if the event occurs.

7. The method of claim 6, wherein the step of determining the reference pixel values comprises:
averaging a plurality of pixel values corresponding to the pixels at the scanline in the images to generate the reference pixel values.

8. The method of claim 6, wherein the step of comparing the pixel values of the scanline in the target image with the reference pixel values further comprises:
if a ratio of a sum of pixel differences between the reference pixel values and the pixel values to a sum of the reference pixel values is greater than a threshold value, determining that the event occurs.

9. The method of claim 6, wherein a selection of the images prior to the target image is updated as the target image is changed.

10. The method of claim 6, wherein the step of analyzing the scanline of the target image comprises:
receiving a plurality of images prior to the target image;
utilizing a reference value to binarize pixel values of all pixels at the scanline in each of the images to identify specific pixels in each of the images that have pixel values greater than the reference value;
utilizing the specific pixels in each of the images to determine a reference position;
utilizing the reference value to binarize pixel values of all pixels at the scanline in the target image to identify specific target pixels having pixel values greater than the reference value;
utilizing the specific target pixels in each of the images to determine a position;
comparing the reference position with the position to determine if the event occurs.

11. The method of claim 10, wherein the step of utilizing the specific pixels in each of the images to determine the reference position comprises:
determining a specific position corresponding to each of the images according to the specific pixels in each of the images; and
averaging a plurality of specific positions corresponding to the images to generate the reference position.

12. The method of claim 10, wherein the step of comparing the reference position with the position further comprises:
if a difference between the reference position and the position is greater than a threshold, determining that the event occurs.

13. The method of claim 10, wherein a selection of the images prior to the target image is updated as the target image is changed.

14. The method of claim 6, further comprising:
preprocessing the target image before executing the step of determining if the event occurs.

15. A system for identifying an event for a vehicle, the system comprising:
a video source;
a receiving circuit, coupled to the video source, for receiving at least a target image from the video source positioned on the vehicle; and
a determining circuit, coupled to the receiving circuit, for determining if the event occurs according to the target image, comprising:
a selecting circuit, for selecting at least a predetermined image region from the target image; and
an analyzing circuit, coupled to the selecting circuit, for analyzing the predetermined image region to determine if the event occurs, comprising:
a buffer circuit, coupled to the selecting circuit, for receiving a plurality of images prior to the target image;
a reference statistical value determining circuit, coupled to the buffer circuit, for determining a reference statistical value of the predetermined image region according to image information of the predetermined image region in each of the images; and
a comparing circuit, coupled to the selecting circuit and the reference statistical value determining circuit, for comparing a statistical value of the predetermined image in the target image with the reference statistical value to determine if the event occurs, wherein if a difference between the reference statistical value and the statistical value is greater than a threshold value, the comparing circuit determines that the event occurs.

16. The system of claim 15, wherein the reference statistical value determining circuit comprises:
an averaging circuit, for averaging a plurality of statistical values corresponding to the predetermined image region in the images to generate the reference statistical value.

17. The system of claim 16, wherein each statistical value is a variance, a mean, or a moment.

18. The system of claim 15, wherein a selection of the images prior to the target image is updated as the target image is changed.

19. The system of claim 15, further comprising:
a preprocessing circuit, coupled to the receiving circuit, for preprocessing the target image.

20. A system for identifying an event for a vehicle, the system comprising:
a video source;
a receiving circuit, coupled to the video source, for receiving at least a target image from the video source positioned on the vehicle; and
a determining circuit, coupled to the receiving circuit, for determining if the event occurs according to the target image, comprising:

a selecting circuit, for selecting a scanline from the target image;

an analyzing circuit, coupled to the selecting circuit, for analyzing the scanline of the target image to determine if the event occurs, comprising:

a buffer circuit, coupled to the selecting circuit, for receiving a plurality of images prior to the target image;

a reference statistical value determining circuit, coupled to the buffer circuit, for determining reference pixel values of pixels at the scanline according to image information of the scanline in each of the images; and a comparing circuit, coupled to the selecting circuit and the reference statistical value determining circuit, for comparing pixel values of the pixels at the scanline in the target image with the reference pixel values to determine if the event occurs.

21. The system of claim 20, wherein the reference statistical value determining circuit comprises:

an averaging circuit, for averaging a plurality of pixel values corresponding to the pixels at the scanline in the images to generate the reference pixel values.

22. The system of claim 20, wherein if a ratio of a sum of pixel differences between the reference pixel values and the pixel values to a sum of the reference pixel values is greater than a threshold value, the comparing circuit determines that the event occurs.

23. The system of claim 20, wherein a selection of the images prior to the target image is updated as the target image is changed.

24. The system of claim 20, wherein the analyzing circuit comprises:

a buffer circuit, coupled to the selecting circuit, for receiving a plurality of images prior to the target image;

a first binarizing circuit, coupled to the buffer circuit, for utilizing a reference value to binarize pixel values of all pixels at the scanline in each of the images to identify specific pixels in each of the images that have pixel values greater than reference value;

a first position determining circuit, coupled to the first binarizing circuit, for utilizing the specific pixels in each of the images to determine a reference position;

a second binarizing circuit, coupled to the selecting circuit, for utilizing the reference value to binarize pixel values of all pixels at the scanline in the target image to identify specific target pixels having pixel values greater than the reference value;

a second position determining circuit, coupled to the second binarizing circuit, for utilizing the specific target pixels in each of the images to determine a position;

a comparing circuit, coupled to the first position determining circuit and the second position determining circuit, for comparing the reference position with the position to determine if the event occurs.

25. The system of claim 24, wherein the first position determining circuit comprises:

a position information determining circuit, for determining a specific position corresponding to each of the images according to the specific pixels in each of the images; and an averaging circuit, coupled to the position information determining circuit, for averaging a plurality of specific positions corresponding to the images to generate the reference position.

26. The system of claim 24, wherein if a difference between the reference position and the position is greater than a threshold, the comparing circuit determines that the event occurs.

27. The system of claim 24, wherein a selection of the images prior to the target image is updated as the target image is changed.

28. The system of claim 20, further comprising:

a preprocessing circuit, coupled to the receiving circuit, for preprocessing the target image.

29. A method for identifying an event for a vehicle, the method comprising:

receiving at least a target image from a video source positioned on the vehicle;

selecting at least a predetermined image region from the target image;

receiving a plurality of images prior to the target image;

determining a reference statistical value of the predetermined image region according to image information of the predetermined image region in each of the images, comprising:

averaging a plurality of statistical values corresponding to the predetermined image region in the images to generate the reference statistical value; and comparing a statistical value of the predetermined image in the target image with the reference statistical value to determine if the event occurs.

30. The method of claim 29, wherein each statistical value is a variance, a mean, or a moment.

31. The method of claim 29, wherein the step of comparing the statistical value of the predetermined image in the target image with the reference statistical value further comprises:

if a difference between the reference statistical value and the statistical value is greater than a threshold value, determining that the event occurs.

32. The method of claim 29, wherein a selection of the images prior to the target image is updated as the target image is changed.

33. A system for identifying an event for a vehicle, the system comprising:

a video source;

a receiving circuit, coupled to the video source, for receiving at least a target image from the video source positioned on the vehicle; and a determining circuit, coupled to the receiving circuit, for determining if the event occurs according to the target image, comprising:

a selecting circuit, for selecting at least a predetermined image region from the target image; and an analyzing circuit, coupled to the selecting circuit, for analyzing the predetermined image region to determine if the event occurs, comprising:

a buffer circuit, coupled to the selecting circuit, for receiving a plurality of images prior to the target image;

a reference statistical value determining circuit, coupled to the buffer circuit, for determining a reference statistical value of the predetermined image region according to image information of the predetermined image region in each of the images, wherein the reference statistical value determining circuit comprises:

an averaging circuit, for averaging a plurality of statistical values corresponding to the predetermined image region in the images to generate the reference statistical value; and a comparing circuit, coupled to the selecting circuit and the reference statistical value determining circuit, for comparing a statistical value of the predetermined image in the target image with the reference statistical value to determine if the event occurs.

34. The system of claim 33, wherein each statistical value is a variance, a mean, or a moment.

35. The system of claim 33, wherein if a difference between the reference statistical value and the statistical value is greater than a threshold value, the comparing circuit determines that the event occurs.

36. The system of claim 33, wherein a selection of the images prior to the target image is updated as the target image is changed.

* * * * *